Dec. 21, 1948.  L. F. HARZA  2,457,041

PIPE T

Filed Sept. 6, 1944

Inventor:
Leroy F. Harza,
By Kent W. Worrell
Atty.

Patented Dec. 21, 1948

2,457,041

UNITED STATES PATENT OFFICE 2,457,041

PIPE T

Leroy F. Harza, Highland Park, Ill.

Application September 6, 1944, Serial No. 552,921

4 Claims. (Cl. 285—105)

This invention relates, in general, to a pipe connection and particularly to an angular or T-joint for pipes of large diameter such as a penstock connection.

An important object of the invention is to provide a pipe connection for a relatively thin pipe which is the equivalent of a saddle flange, and does not depend upon the stiffness of the saddle alone, but provides internal webs which carry the tension in the pipe across the opening instead of requiring it to pass around the circumference of the branch opening.

A still further object of the invention is to provide a pipe joint in which the branch is enlarged at the opening so as to compensate for the restriction due to the tension webs extending across the opening without impairing the full capacity of the branch pipe.

A still further object of the invention is to reinforce the tension webs by connecting them together intermediate their ends without impairing the capacity of the main pipe.

Other objects of the invention will appear in the specification and will be apparent from the accompanying drawing in which Fig. 1 is a sectional view of a pipe T in accordance with this invention;

Figure 1:
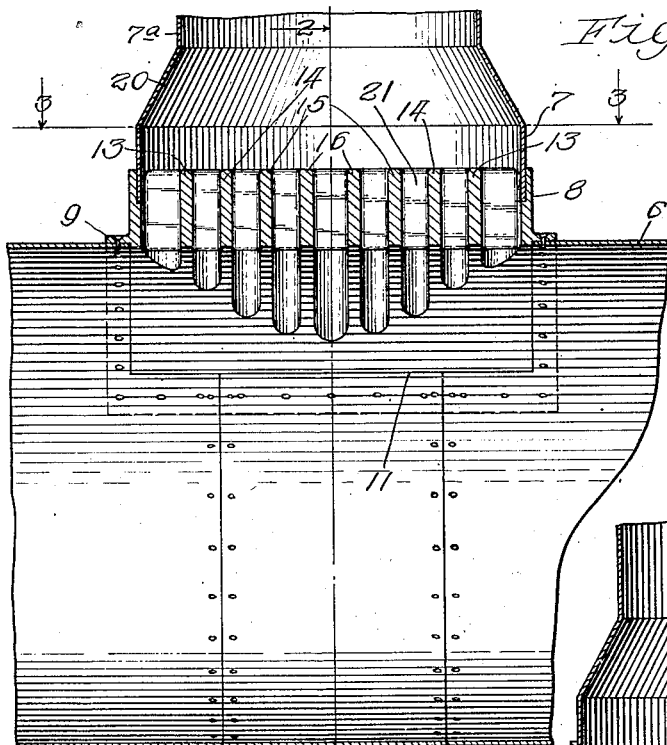
Figure 2:
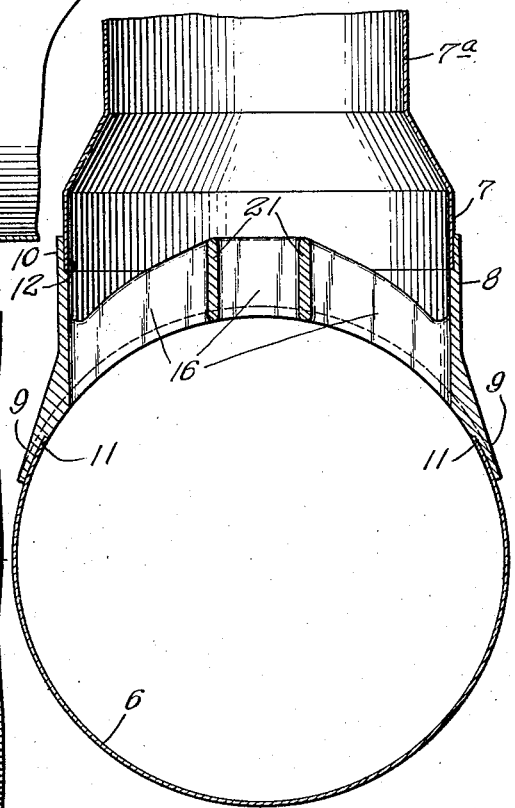
Fig. 2 is a transverse section taken on the line 2—2 of Fig. 1.
Figure 3:
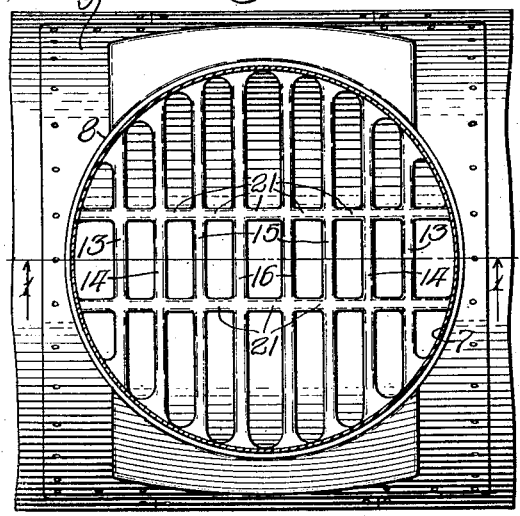
Fig. 3 is a plan section taken on the line 3—3 of Fig. 1.

The internal pressure in a pipe produces circumferential tension which is the principal stress to which it is subjected. In a large pipe having a diameter of many feet, the circumferential sheets or strips of metal of which it is made are discontinuous at the opening to the branch, and there is no part to take up this tension except a very stiff saddle flange, or in the case of ordinary cast iron fittings, the excess thickness of the metal is so great that the stresses are carried around the branch opening by the general stiffness and thickness of the casting. In a large pipe made of sheet plates, it becomes impracticable to build a saddle flange which is strong enough to carry the stresses around the opening as the thickness of the metal in a large pipe is very small compared with the diameter of the pipe.

In the present invention, an improved construction and connection is provided which does not depend upon the stiffness of the connector alone but is tied together with a series of webs in the saddle flange, the inside curve of each web continuing the line of the interior radius of the main pipe. These webs thus carry the tension across the opening instead of requiring it all to pass around the circumference of the branch opening. In addition, the webs are strengthened by cross connections if needed for lateral stiffness.

Referring now more particularly to the drawings, a large pipe 6 is made of circumferential metal sheets or plates suitably secured together as used for a flume or penstock. To connect a branch pipe 7 thereto, requires a large opening and a correspondingly large fitting 8 having a saddle portion 9 to extend over the opening and a tubular portion 10 to receive the end of the branch pipe. The inner edges of the saddle and tubular portion are formed with recesses 11 and 12 respectively to receive the ends of the circumferential sheets forming the pipe 6 and the end of the pipe 7 and to make them flush with the insides of the fitting 8.

It will be understood that the ends of the sheets or plates forming the pipe 6 and the end of the pipe 7 are secured to each other and to the fitting 8 by suitable rivets, welding, or other suitable means of attachment which forms no particular part of the present invention.

Extending across the fitting 8 and circumferentially of the opening of the large pipe 6 are ribs 13, 14, 15 and 16, the number depending upon the sizes of the pipes.

Between the transverse curved ribs and preferably at each side of the center are short connecting webs 21 which stiffen the main ribs laterally.

In this construction, the ribs become progressively longer and occupy a larger proportion of the complete arc of the circle from the sides of the fitting toward the center thereof, the ribs thus being in pairs, each pair differing in design from the others, and having a different bending moment.

Where no restriction of the inlet pipe can be permitted, and where the full capacity of the branch pipe must be developed, the extremity of the branch pipe 7 is larger than the line or main portion 7ª in order to allow for the space occupied by the strengthening ribs and webs. Thus the net cross sectional areas of the openings is equal to or greater than the cross sectional area of the branch pipe in its contracted or smaller portion.

The unit tension in a circumferential strip of plate taken out of a pipe is the same no matter whether the circle is completed or not. No matter how short the portion of the circumference may be, the stress is the same and depends only upon the pressure and the radius of curvature. Therefore, taking out the opening for a branch pipe does not reduce or increase the stress in the circumferential plate, but where the opening is, the line of stress continues in a straight line from the end of the plate tangent to the curve of the plate at the point where the plate terminates. If a neutral axis is drawn lengthwise of the ribs which must transfer this stress between the two discontinuous ends of the circumferential plate, then the bending moment in these ribs at any point will be represented by the stress along the tangent line multiplied by its moment arm at each point from the neutral axis in the rib. Thus the maximum moment would be indicated by the tension along the tangent line at the center multiplied by the distance from the center to the neutral axis of the rib at the center. Thus the ribs can readily be designed to resist this bending moment. The preferred structure seems to be a curved rib tapering from the center to each side thereof and rounded at each of its upper and lower edges.

With this construction, a pipe fitting or T is produced which has sufficient strength to carry the tension across the lateral opening.

I claim:

1. A pipe T comprising a main pipe and a branch pipe at an angle thereto, the main pipe having an opening in its wall for the branch pipe, a saddle fitting extending around and secured to the edge of the opening, the fitting having a plurality of ribs extending across the opening and conforming in curvature to the inside radius of the main pipe to carry the wall strength of the main pipe across the opening, the ribs varying in length from the center to the edges of the opening.

2. In a pipe T, a main pipe with a wall opening therein, a branch pipe for the opening, a fitting for the edge of the opening with ribs extending across the opening transverse to the main pipe and conforming to the curvature of the inside of the main pipe, the length of the ribs depending upon their distance from the center of the opening and reinforcing webs between adjacent ribs intermediate the ends thereof.

3. A pipe T comprising a main pipe with an opening in the wall, a branch pipe for the opening, a fitting for the opening, ribs in the fitting extending across the opening, tapering from the center toward the ends and conforming to the inner surface of the main pipe, and a reinforcing web connecting adjacent ribs.

4. A pipe T comprising a main pipe with an opening in the wall, a branch pipe for the opening, a fitting having ribs extending across the opening and thus restricting the opening into the main pipe, and the branch pipe being enlarged at the end only so that the net cross sectional area of the openings between the ribs will be approximately that of the cross sectional area of the main portion of the branch pipe.

LEROY F. HARZA.

REFERENCES CITED

The following references are of record in the file of this patent:

UNITED STATES PATENTS

| Number | Name | Date |
|---|---|---|
| 540,336 | Rubenstein | June 4, 1895 |
| 1,165,005 | Robinett et al. | Dec. 28, 1915 |
| 1,826,555 | Lonskey | Oct. 6, 1931 |